(12) United States Patent
Zhang et al.

(10) Patent No.: US 12,689,792 B2
(45) Date of Patent: Jul. 21, 2026

(54) PAGE DISPLAY METHOD AND APPARATUS, ELECTRONIC DEVICE AND STORAGE MEDIUM

(71) Applicant: Beijing Youzhuju Network Technology Co., Ltd., Beijing (CN)

(72) Inventors: Qinyuan Zhang, Beijing (CN); Ting Zhou, Beijing (CN); Liangcheng Xu, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/572,575

(22) PCT Filed: Oct. 24, 2022

(86) PCT No.: PCT/CN2022/126980
§ 371 (c)(1),
(2) Date: Dec. 20, 2023

(87) PCT Pub. No.: WO2023/088036
PCT Pub. Date: May 25, 2023

(65) Prior Publication Data
US 2024/0292052 A1      Aug. 29, 2024

(30) Foreign Application Priority Data

Nov. 18, 2021    (CN) .......................... 202111367634.7

(51) Int. Cl.
*H04N 21/431*        (2011.01)
*H04N 21/2187*       (2011.01)
*H04N 21/485*        (2011.01)
(52) U.S. Cl.
CPC ..... *H04N 21/4316* (2013.01); *H04N 21/2187* (2013.01); *H04N 21/4852* (2013.01)

(58) Field of Classification Search
CPC ........... H04N 21/4316; H04N 21/2187; H04N 21/4852
See application file for complete search history.

(56) References Cited

U.S. PATENT DOCUMENTS

2021/0389858 A1 * 12/2021 Gong .................... G06F 3/0485
2022/0239988 A1 *  7/2022 Yang .................. H04N 21/4725
(Continued)

FOREIGN PATENT DOCUMENTS

CN        107038201 A      8/2017
CN        107734380 A      2/2018
(Continued)

OTHER PUBLICATIONS

Mingzhen, "How to set the partner window of Tiktok live broadcast? Learn how to adjust the window", Available online at: <https://www.xitongzhijia.net/xtjc/20191126/168166.html>, Sep. 20, 2019, 5 pages.

(Continued)

*Primary Examiner* — Mulugeta Mengesha
(74) *Attorney, Agent, or Firm* — Astute IP Law Group

(57) ABSTRACT

A page display method and apparatus, an electronic device and a storage medium. The page display method includes: in response to a display request for a content display page of the target object, acquiring live information of current live streaming of a target object in a case where the target object is in a live streaming state, in which the live information comprises live content and live associated information; displaying the content display page, in which the content display page comprises a content display region and a live region, the live region is configured to display live information; and the content display region is configured to display posted content of the target object.

17 Claims, 6 Drawing Sheets

(56)             References Cited

U.S. PATENT DOCUMENTS

| | | | |
|---|---|---|---|
| 2024/0129575 A1* | 4/2024 | Xuan .................. | H04N 21/2187 |
| 2024/0298061 A1* | 9/2024 | Wang .................... | H04N 21/431 |
| 2024/0314386 A1* | 9/2024 | Fang .................. | H04N 21/8549 |

FOREIGN PATENT DOCUMENTS

| | | | |
|---|---|---|---|
| CN | 108108990 A | 6/2018 | |
| CN | 108111919 A | 6/2018 | |
| CN | 110265032 A | 9/2019 | |
| CN | 111586474 A | 8/2020 | |
| CN | 111724222 A | 9/2020 | |
| CN | 111767487 A | 10/2020 | |
| CN | 111818358 A | 10/2020 | |
| CN | 112153396 A | 12/2020 | |
| CN | 112272302 A | 1/2021 | |
| CN | 112995691 A | 6/2021 | |
| CN | 115967814 A | 4/2023 | |
| CN | 118247010 A | 6/2024 | |
| CN | 116137662 B | 5/2025 | |
| JP | 2019102073 A | 6/2019 | |
| WO | 2017168441 A1 | 10/2017 | |

OTHER PUBLICATIONS

Office Action for Chinese Patent Application No. 202111367634.7, mailed on Jul. 25, 2024, 29 pages.

Weixin_33974433, "Reasons for Expanding Touch Panel AA Area", Available online at: <https://blog.csdn.net/weixin_33974433/article/details/90338576>, Nov. 3, 2017, 6 pages.

Notice of Allowance for Chinese Patent Application No. 202111367634. 7, mailed on Apr. 11, 2025, 6 pages.

* cited by examiner

In response to a display request for a content display page of the target object, acquiring live information of current live streaming of a target object in a case where the target object is in a live streaming state, the live information including live content and live associated information — S110

Displaying the content display page, the content display page including a content display region and a live region, the live region being configured to display live information, and the content display region being configured to display posted content of the target object — S120

FIG. 1

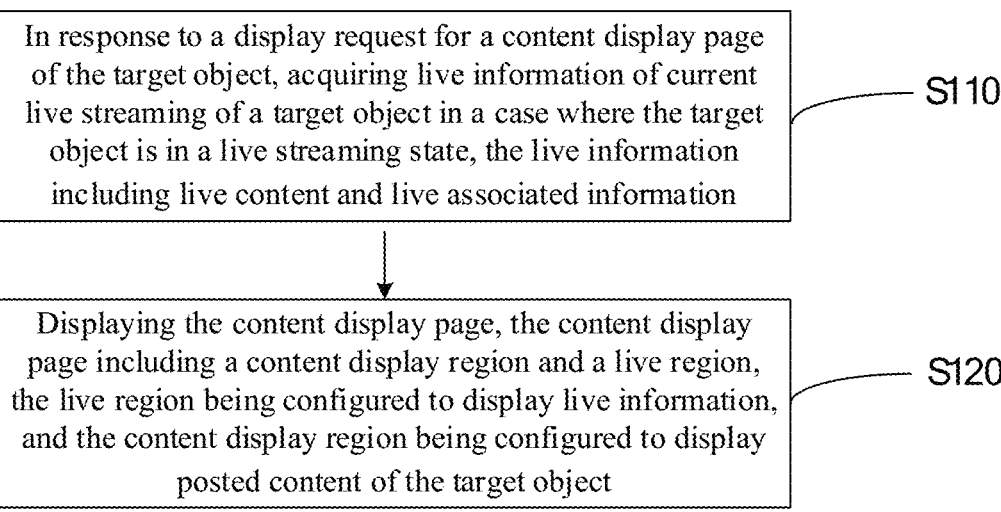

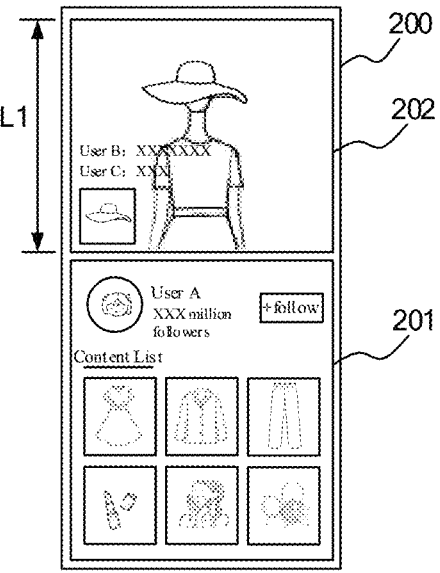

Network

Database page display apparatus 500 acquiring module 510 displaying module 520

700

PAGE DISPLAY METHOD AND APPARATUS, ELECTRONIC DEVICE AND STORAGE MEDIUM

The present application is a national stage application based on International Patent Application No. PCT/CN2022/126980, filed Oct. 24, 2022, which claims priority to Chinese Patent Application No. 202111367634.7, filed on Nov. 18, 2021, the disclosures of which are incorporated herein by reference in their entireties.

TECHNICAL FIELD

Embodiments of the present disclosure relate to a page display method and apparatus, an electronic device and a storage medium.

BACKGROUND

With development of network and computer technology, the media forms are becoming increasingly diverse. The media forms that have emerged in recent years, such as online live streaming and short videos, have become increasingly integrated into people's lives. For example, some users may initiate online live streaming, while others may enter a live room page of any live streaming user to watch the live streaming. In order to attract users to watch the ongoing live streaming, some applications adopt prompt means, for example, adding words "live streaming" to an avatar of a user in the ongoing live streaming to prompt other users to watch the current live streaming.

SUMMARY

The existing live streaming prompt modes have a weak prompt effect and cannot provide users with intuitive and rich visual experience. With respect to the above-described problems, at least one embodiment of the present disclosure provides a page display method and apparatus, an electronic device, a storage medium and a program product, which can achieve a clear live streaming prompt effect, attract users browsing the page to watch the current live streaming, and provide users browsing the page with more intuitive and rich visual experience.

At least one embodiment of the present disclosure provides a page display method including: in response to a display request for a content display page of the target object, acquiring live information of current live streaming of a target object in a case where the target object is in a live streaming state, in which the live information includes live content and live associated information; displaying the content display page, in which the content display page includes a content display region and a live region, the live region is configured to display live information, and the content display region is configured to display posted content of the target object.

At least one embodiment of the present disclosure provides a page display apparatus including an acquiring module and a displaying module, the acquiring module is configured to, in response to a display request for a content display page of the target object, acquire live information of current live streaming of a target object in a case where the target object is in a live streaming state, in which the live information includes live content and live associated information. The displaying module is configured to display the content display page, in which the content display page includes a content display region and a live region, the live region is configured to display the live information; and the content display region is configured to display posted content of the target object.

At least one embodiment of the present disclosure provides an electronic device, including: a processor; a memory, including one or more computer program modules; in which the one or more computer program modules are stored in the memory and configured to be executed by the processor, and the one or more computer program modules include instructions for implementing the page display method according to any embodiment of the present disclosure.

At least one embodiment of the present disclosure provides a storage medium, configured to store non-temporary computer readable instructions, the non-temporary computer readable instructions, when executed by a computer, implement the page display method according to any embodiment of the present disclosure.

At least one embodiment of the present disclosure provides a computer program product, including computer programs hosted on a non-temporary computer readable medium, in which the computer program includes program codes for executing the page displaying method according to any embodiment of the present disclosure.

BRIEF DESCRIPTION OF THE DRAWINGS

The above-described and other features, advantages and aspects of the respective embodiments of the present disclosure will become more apparent when taken in conjunction with the accompanying drawings and with reference to the detailed description below. Throughout the drawings, same or similar reference signs refer to same or similar elements. It should be understood that, the drawings are schematic and that originals and elements are not necessarily drawn to scale.

FIG. 1 is a schematic flow chart of a page display method provided by some embodiments of the present disclosure;

FIG. 2 is a schematic diagram of a content display page provided by some embodiments of the present disclosure;

DETAILED DESCRIPTION

Figure 3:
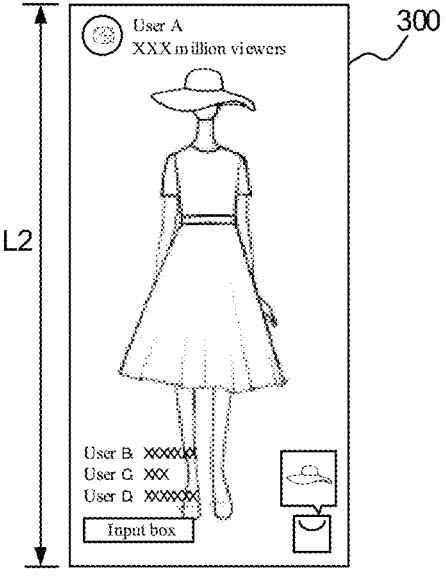
FIG. 3 is a schematic diagram of a live room page provided by some embodiments of the present disclosure.

Embodiments of the present disclosure will be described in more detail below with reference to the accompanying drawings. Although some embodiments of the present disclosure are shown in the drawings, it should be understood that the present disclosure may be implemented in various forms and should not be construed as limited to the embodiments set forth here. On the contrary, these embodiments are provided for a more thorough and complete understanding of the present disclosure. It should be understood that the drawings and embodiments of the disclosure are only for illustrative purposes, and are not intended to limit the protection scope of the disclosure.

It should be understood that the steps described in the method embodiments of the present disclosure may be performed in different order and/or in parallel. In addition, the method embodiments may include additional steps and/or omit the steps shown. The scope of the present disclosure is not limited in this respect.

As used herein, the term "including" and its variations are open including, that is, "including but not limited to". The term "based on" means "at least partially based on". The term "one embodiment" means "at least one embodiment"; the term "another embodiment" means "at least one other embodiment"; the term "some embodiments" means "at least some embodiments". Relevant definitions of other terms will be given in the following description.

It should be noted that the concepts of "first" and "second" mentioned in the disclosure are only used to distinguish devices, modules or units, and are not used to limit that these devices, modules or units must be different devices, modules or units, nor to limit the order or interdependence of the functions performed by these devices, modules or units.

It should be noted that the modification "one" and "a plurality" mentioned in this disclosure are illustrative rather than restrictive, and those skilled in the art should understand that unless the context clearly indicates otherwise, they should be understood as "one or more". "a plurality" should be understood to mean two or more.

The names of interactive messages or information between a plurality of devices in the embodiment of the present disclosure are for illustrative purposes only and should not restrict the scope of the messages or information.

In related technologies, live streaming is usually prompted in a form of text, for example, by adding words "live streaming" to an avatar of a user or adding words "live streaming" to a name of the user. Since the text is displayed statically and occupies a small area, the text has a weak prompt effect and cannot provide users with more intuitive and rich visual experience.

At least one embodiment of the present disclosure provides a page display method and apparatus, an electronic device, a storage medium and a program product, which can achieve a clear live streaming prompt effect, attract users browsing the page to watch the current live streaming, and may provide users browsing the page with more intuitive and rich visual experience.

Hereinafter, the embodiments of the present disclosure will be illustrated in detail with reference to the accompanying drawings.

FIG. 1 is a schematic flow chart of a page display method provided by some embodiments of the present disclosure. As shown in FIG. 1, in at least one embodiment, the method includes operations below.

Step S110: in response to a display request for a content display page of the target object, acquiring live information of current live streaming of a target object in a case where the target object is in a live streaming state, the live information including live content and live associated information.

Step S120: displaying the content display page, the content display page including a content display region and a live region, the live region being configured to display live information, and the content display region being configured to display posted content of the target object.

For example, the page display method provided by the embodiment of the present disclosure may be executed by a terminal device; the terminal device includes but is not limited to a mobile phone, a tablet computer, a laptop, etc. The terminal device may include a display screen, a processor, a data transceiver apparatus, etc.; and the terminal device may transmit data to a server and/or a database through a communication network.

For example, in step S110, the target object may include a user of an application; different users may be distinguished by different accounts; and the user may be an individual user, an enterprise user, etc. The content display page of the target object may be a home page of the user; the home page of the user may display avatar, name, introduction information, and posted content, etc. of the user; the posted content may include contents such as text, images, and videos posted; a home page of each user may be viewed by other users of the application. Taking the target object as user A, the display request for the content display page of the target object may be a view request for a home page of user A initiated by a user in the application (e.g., user B), that is, a request to enter the home page of user A.

For example, information on a home page of a user may be stored in a server or in a database in communication with the server. In some examples, user B may send a view request for the home page of user A to the server through the terminal device. After receiving the request, the server may firstly confirm whether user A is currently live streaming; if YES, the server may send the live information of the current live streaming of user A to the terminal device, so that the terminal device acquires the live information of the current live streaming of user A.

For example, the live information includes the live content and the live associated information. The live content may be considered as a main component of live streaming, and may convey a content to be introduced by the live streaming user. In the case where the current live streaming of user A is in a form of video, the live content may include a live video; in the case where the current live streaming of user A is in a form of image, the live content may include a live image. The live associated information includes other related information except the live content during the live streaming process, for example, comment information posted by a user watching the live streaming, information about an item involved in the live streaming, etc.

For example, the display request for the content display page of the target object may be generated in various modes. Taking the content display page of the target object as the home page of user A, in some examples, user B may search for relevant information (e.g., name) of user A through a search function of the application, so that a list of users including user A may be found; and user B may click on a position such as the avatar or the name of user A from the user list to generate the display request for the home page of user A, which can then be viewed. In other examples, if user B browses content (e.g., videos, images, etc.) posted by user A, then user B may click on a position such as the avatar or the name of user A, so that a display request for the home page of user A may be generated. In addition, the display request may also be generated in other modes, which will not be limited in the embodiments of the present disclosure.

For example, in step S120, following the above-described example, the terminal device may display the content display page of user A after acquiring the live information of user A.

FIG. 2 is a schematic diagram of a content display page provided by some embodiments of the present disclosure. As shown in FIG. 2, the content display page 200 may include a content display region 201 and a live region 202. The content display region 201 is configured to display the posted content of the target object; for example, user A may post content such as videos, images, text, etc. through the application, for other users to browse. The content posted by user A may be displayed at least partially on the home page of user A. Post time of the posted content may be earlier or later than start time of the current live streaming; for example, user A may already have a plurality of pieces of content posted before the current live streaming, or user A may post new content during the live streaming process. In addition, the content display region 201 may further display information such as avatar, name, and the number of followers of user A. The live region 202 is configured to display live information, for example, the live region 202 may display a live video and live associated information (e.g., user comments, item tags, etc.). The live video displayed in the live region 202 may be synchronized with a video played on a live room page of user A in terms of time. The live associated information displayed in the live region may be a portion of information selected from the live associated information of the live room. The live associated information may be displayed in a dynamic form, for example, displayed in a form of scrolling playback.

For example, a display area of the live region 202 is not less than ⅓ of a display area of the content display page 200. For example, the display area of the live region 202 may be half of the display area of the content display page 200. In such mode, the live information may be displayed in a larger area on the content display page 200, to achieve better watching and prompt effects.

For example, in some examples, the live region 202 and the content display region 201 may be arranged along a direction parallel to a side edge of the content display page 200, that is, in an up-down direction shown in FIG. 2. For example, the live region 202 may be located on a side of the content display region 201 close to a top edge of the content display page 200, that is, the live region 202 is located at a top portion of the page, and the content display region 201 is located at a bottom portion of the live region 202. In other examples, the live region 202 and the content display region 201 may be arranged along a direction perpendicular to the side edge of the content display page 200, that is, may be arranged in a left-right direction.

In the page display method according to the embodiment of the present disclosure, the live information of the current live streaming is displayed on the home page of the live streaming user or other pages used to display the posted content, based on which a clear live streaming prompt effect can be achieved for the users browsing the page, thereby attracting the users browsing the page to watch the current live streaming. Moreover, the live video and the live associated information may provide the users browsing the page with more intuitive and rich visual experience, and allow the users browsing the page to watch the live information without entering the live room page, which improves user experience.

For example, the live content is a live video; and the live region displays a portion of image of the live video. A display size of the live region 202 is smaller than a display size of the live room page, so a portion of image of the live video may be displayed in the live region 202, that is, for each image frame in the live video, a portion of image may be intercepted, and a portion of each image frame may be sequentially displayed in the live region. At least one of three modes below may be adopted to intercept a portion of image from each image frame.

For example, in the first mode, a portion of an image displayed in the live region is intercepted from an image frame through an image recognition model. For example, a face position in the image frame may be recognized through the image recognition model, and a region where the face is located is intercepted; in such mode, it may be ensured that the picture displayed in the live region includes a face, making watching experience better. For another example, an item currently being explained in a live video may be acquired, a position where the item is located in the image frame is recognized through the image recognition model, and a region where the item currently being explained is located is intercepted; in such mode, it may be ensured that the picture displayed in the live region includes the item currently being explained. The image recognition model may be pre-trained according to sample data; the image recognition model may be, for example, a neural network model, a deep learning model, etc.; and the image recognition model may be deployed in a server or a terminal device.

For example, in the second mode, a portion of an image displayed in the live region is obtained by intercepting a predetermined region of an image frame. For example, an image region with a target size may be intercepted as a portion of image displayed in the live region using a center of the image frame as the interception center.

For example, in the third mode, a portion of an image displayed in the live region is obtained by intercepting a region indicated by marker information from an image frame. For example, a region to be intercepted of some image frames may be pre-marked, and during interception, the region is intercepted according to the marker information.

FIG. 3 is a schematic diagram of a live room page provided by some embodiments of the present disclosure. As shown in FIG. 2 and FIG. 3, for example, the page display method may further include: in response to a first interactive operation on the live region 202, transforming the content display page 200 into the live room page 300 corresponding to the current live streaming. For example, the first interactive operation may be a touch operation; the touch operation may include operations such as click, double click, slide, etc.; in addition, the first interactive operation may also be a voice operation, a gesture operation, etc.; a specific form of the first interactive operation will not be limited in the embodiments of the present disclosure. Based on the mode, by performing an interactive operation on the content display page 200, the user may directly enter the live room page to watch complete live information, making operations simple and fast.

For example, the live region 202 is covered with a filter layer to display a portion of image of the live video. For example, a layer of colored filter, for example, a yellow filter or a red filter, may be covered on an upper layer of the live region 202, to prompt that a touch operation may be executed on the live region 202. In some examples, a portion of the live region 202 may be set as a touch region linked to the live room page; and in response to a touch operation on this touch region, the content display page may be transformed to the live room page. Correspondingly, a filter layer may be covered on an upper layer of the touch region, to prompt that the touch operation may be executed on the region.

For example, as shown in FIG. 2 and FIG. 3, the live region 202 has a first display size L1; and the live room page 300 has a second display size L2. During the process of transforming the content display page 200 to the live room page 300 of the current live streaming, the live region 202 gradually changes from the first display size L1 to the second display size L2; and the live region 202 gradually changes from displaying a portion of image of the live video to displaying an entire image of the live video. The first display size and the second display size may be sizes along a side edge extension direction of the content display page (i.e. the up-down direction shown in the figure), hereinafter also referred to as vertical sizes.

For example, during the size change process of the live region 202, an edge of the live region 202 gradually expands outward, for example, a bottom edge of the live region 202 gradually expands downwards to present a gradually expanding and enlarging effect. Moreover, as the display area of the live region 202 gradually increases, the image region displayed in the live region 202 also gradually increases.

Figure 4:
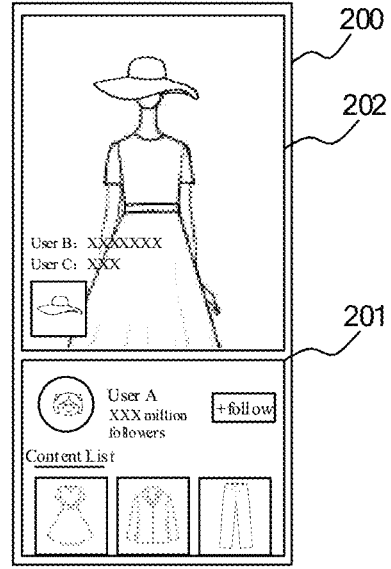
FIG. 4 is a schematic diagram of the content display page during a change process provided by some embodiments of the present disclosure.

FIG. 4 is a schematic diagram of the content display page during a change process provided by some embodiments of the present disclosure. As shown in FIG. 2, FIG. 3 and FIG. 4, during the process of enlarging from the live region 202 to the live room page 300, the remaining image region of the image frame are gradually expanded out of an edge of at least one side (e.g., a bottom edge) of the image shown in the live region 202 in FIG. 2, until the size of the live region 202 changed to the second display size L2 and forming the live room page 300, which may present the entire region of the image frame. In addition, during the enlarging process of the live region 202, live associated information such as comment information may also gradually change a position. Based on the mode, the live region 202 may be gradually transformed into a live room region through an interactive operation, making page change forms more novel and diverse, and improving interactive experience.

Figure 5:
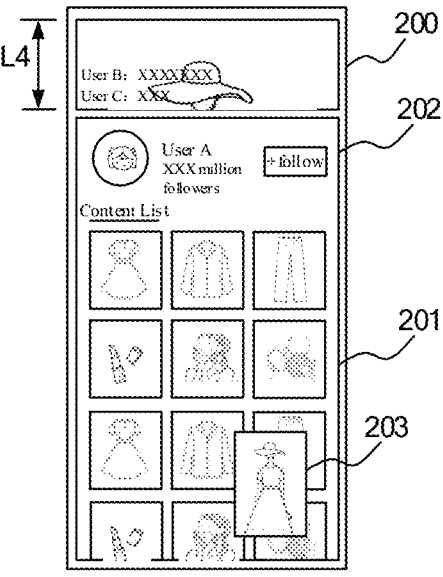
FIG. 5 is a schematic diagram of another content display page provided by some embodiments of the present disclosure.

FIG. 5 is a schematic diagram of another content display page provided by some embodiments of the present disclosure. As shown in FIG. 2 and FIG. 5, the page display method may further include steps of: in response to a second interactive operation on the content display page 200, making the display size of the live region 202 decrease, and making the display size of the content display region 201 increase; displaying a page floating window 203 on the content display region 201, in a case where the display size of the live region 202 decreases to an area threshold, the page floating window 203 is configured to display information about the live content.

For example, the second interactive operation may be a touch operation, for example, an up-slide operation. In addition, the second interactive operation may also be a voice operation, a gesture operation, etc.; a specific form of the second interactive operation may be determined according to actual situations, and will not be limited in the embodiments of the present disclosure. In response to the second interactive operation, an area occupied by the live region 202 gradually decreases; correspondingly, the content display region 201 gradually expands upwards, presenting an effect of the entire content display page 200 sliding upwards until the size of the live region 202 is less than or equal to a certain threshold, for example, until a vertical size of the live region 202 is less than or equal to a threshold L4, the size of the live region 202 is considered too small, in which case, the page floating window 203 may be displayed in a superposed manner in the content display region 201 to better display live information in the page floating window 203. The threshold L4 may be a value within a range of [0, L1), which may be specifically determined according to actual situations.

For example, the live associated information is divided into M categories; the M categories include at least one of associated object tag, transaction information, and comment information; M is a positive integer. For example, the associated object tag may be a tag of an item involved in the live video; the item tag may be linked to a detail page or a purchase page of the item; and the item tag may present information such as item picture, item name, and item price. The transaction information may be purchase information of an item involved in the live video; the purchase information may include name of a purchasing user and/or name of a product purchased by the user; which may be, for example, presented in a form of "user XX is purchasing item XX". The comment information may be a comment submitted by a user watching the live streaming, and the comment information may be presented in a form of characters, emoticons, pictures, etc. In addition, the live associated information may further include information about a user entering or leaving the live room, for example, it may be presented in a form of "user XX entering the live room" or "user XX leaving the live room". In some examples, the live associated information may further include like information and virtual gift information.

For example, the live region 202 displays information of N categories out of the M categories, N is a positive integer less than M, that is, the live region 202 may only display information for some categories out of the M categories. For example, the M categories may include associated object tag, transaction information, comment information, information about a user entering or leaving the live room, like information, and virtual gift information; since a limited display size of the live region 202, only the associated object tag and the comment information may be displayed in the live region 202, to display relatively more important information in the live region 202, which is convenient for the watching user to understand key information during the live streaming process.

For example, the N categories may be obtained based on a user selection operation. For example, a selection control may be set on the content display page or other pages; the selection control may be linked to a selection page; and options for the M categories may be set on the selection page for the user to select from; thereafter, information of corresponding categories may be displayed in the live region 202 according to the categories selected by the user. For example, in the case where a user selects three categories, i.e., associated object tag, transaction information, and comment information, the information of the three categories may be displayed in the live region 202. An executing subject of the selection operation may be a live streaming user or a user watching the live streaming. Based on the mode, the user may autonomously select the live associated information to be presented in the live region 202, which may make display more personalized, to adapt to different needs and habits of each user, and improve user experience.

For example, the live region displays a portion of information in each of the N categories; and the portion of information may be selected from the information of the N categories based on an information analysis model. For example, each category of the N categories includes a plurality of pieces of information; the information analysis model may be utilized to select some pieces of information from each category as high-quality information, and display the high-quality information in the live region 202. Taking comment information as an example, a comment entry is provided on the live room page; and each watching user may input comment information such as text or pictures through the comment entry and post the same. Comment information posted by all watching users may be aggregated into a comment information collection, and some pieces of high-quality comment information may be selected from the comment information collection, and displayed in the live region 202. For example, a pre-trained information analysis model may be utilized to select comment information that meets predetermined conditions from the comment information collection.

For example, in some embodiments, the predetermined conditions may include requirements for contents of the comment information, for example, requirements for the number of words in the comment information, words used in the comment information, etc., which may be, for example: (1) the number of words in the comment information shall not exceed the predetermined number of words; (2) the words used include specific types of statements, etc. The predetermined conditions may be specifically determined according to actual needs, and will not be limited in the embodiments of the present disclosure. For example, in other embodiments, the predetermined conditions may further include requirements for post operations such as post time of the comment information and post users of the comment information. For example, the predetermined conditions may include: (1) the post time is later than a predetermined time point; (2) the post user is a high-quality user, etc. In other embodiments, the predetermined conditions may further include a requirement for a score of the comment information; the information analysis model may be a scoring model; the scoring model may rate each piece of comment information to select a piece of comment information with a higher score from a plurality of pieces of comment information as high-quality comment information. The information analysis model may be, for example, a neural network model, a tree model, or other types of model, or a mode formed by a combination of a variety of models. The information analysis model may be deployed in a server or a terminal device.

For example, the associated object tag displayed in the live region includes at least one of: a tag of an associated object being displayed by live content at a current moment; a tag of an associated object located in a specific ranking position among a plurality of associated objects corresponding to live content; and a tag of an associated object having an optimal transaction parameter among a plurality of associated objects corresponding to live content.

For example, in some examples, an item tag displayed in the live region 202 may be a tag of an item currently being explained in the live video. In other examples, an item tag displayed in the live region 202 may be a tag of an item ranked first, last, or in a specific order among all the items involved in the current live streaming. In other examples, an item tag displayed in the live region 202 may also be a tag of an item with highest selling within a certain time period among all the items involved in the current live streaming. In addition, an item tag displayed in the live region 202 may also be a tag of an item with a highest level of attention among all the items involved in the current live streaming.

For example, the page display method may further include steps of: turning off or turning on sound of live content in response to a third interactive operation on the content display page; in a case where the sound of the live content is to be turned off, making the sound of the live content gradually decrease within a predetermined time length after receiving the third interactive operation; in a case where the sound of the live content is to be turned on, making the sound of the live content gradually increase within a predetermined time length after receiving the third interactive operation.

For example, the third interactive operation may be a touch operation, a voice operation, or a gesture operation, etc. which may be specifically determined according to actual situations.

Figure 6:
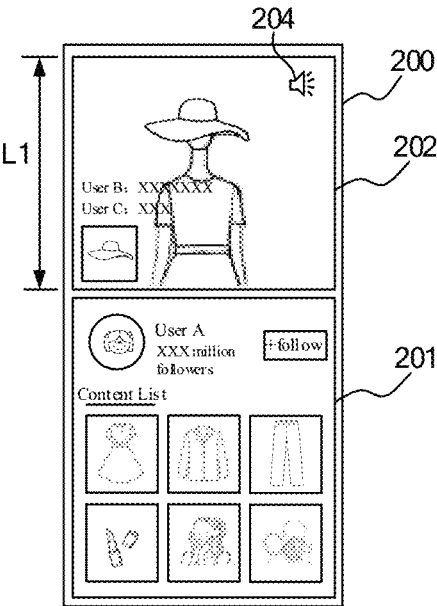
FIG. 6 is a schematic diagram of another content display page provided by some embodiments of the present disclosure.

FIG. 6 is a schematic diagram of another content display page provided by some embodiments of the present disclosure. As shown in FIG. 6, the content display page 200 may include a first control 204; and an audio corresponding to the live video may be controlled to be turned on and off by the first control 204. For example, in a case where the audio is in a playback state, in response to receiving a touch operation on the first control 204, the audio may be converted from the playback state to an off state; during the process of turning off the audio, the audio sound may be made gradually decrease till disappear within a period of time (e.g., 2 S), achieving a fade-out effect. For another example, in a case where the audio is in the off state, in response to receiving a touch operation on the first control 204, the audio may be converted from the off state to a playback state, during the process of turning on the audio, the audio sound may be made gradually increase to a target volume within a period of time (e.g., 2 S), achieving a fade-in effect.

It should be noted that according to the embodiment of the present disclosure, an execution order of the respective steps of the page display method will not be limited; although the execution process of the respective steps is described in a specific order above, this does not constitute a limitation on the embodiments of the present disclosure. The respective steps in the page display method may be executed in serial or in parallel, which may be determined according to actual needs. For example, the page display method may further include more or fewer steps, for example, adding some pre-processing steps, or storing data of some intermediate procedures for use in subsequent processing and calculation to omit some similar steps.

Figure 7:
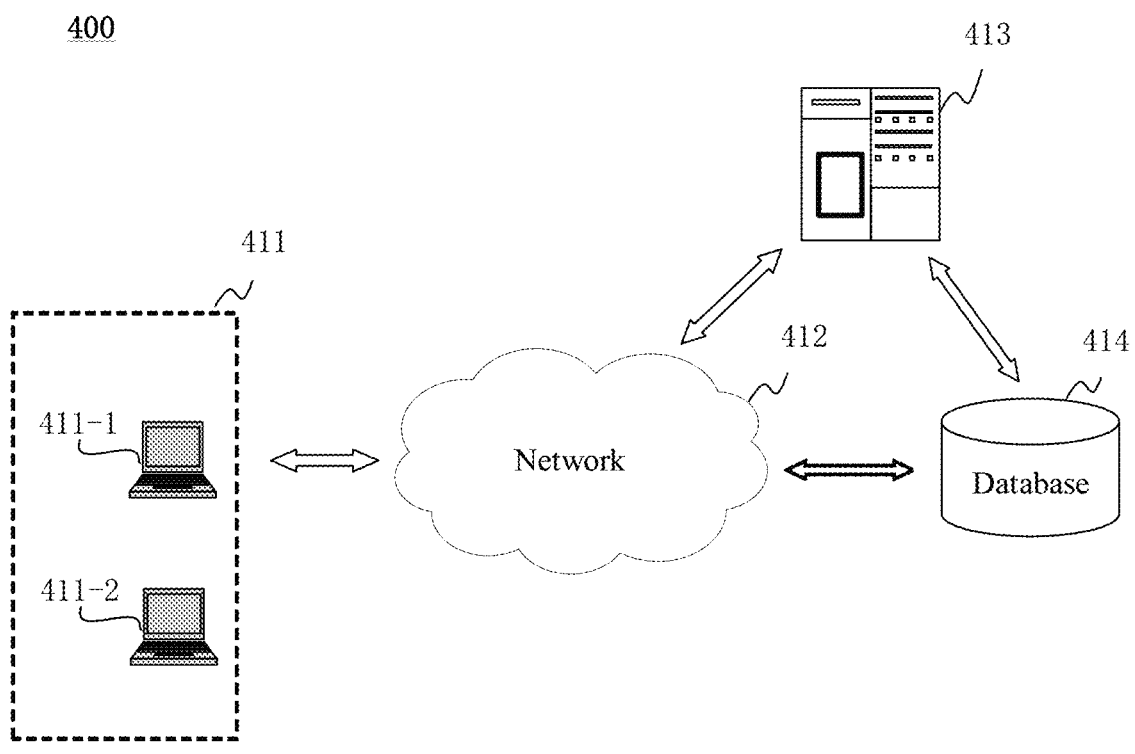
FIG. 7 is a system that may be used to implement the page display method provided by the embodiments of the present disclosure.

FIG. 7 is a system that may be used to implement the page display method provided by the embodiments of the present disclosure. As shown in FIG. 7, the system 400 may include a user terminal 411, a network 412, a server 413, and a database 414. For example, the system 410 may be configured to implement the page display method provided by any embodiment of the present disclosure.

The user terminal 411 includes, for example, a device 411-1 and a device 411-2. It may be understood that the user terminal 411 may be any other type of electronic device capable of performing data processing, including but not limited to, a desktop computer, a laptop, a tablet computer, a workstation, etc. The user terminal 411 may also be any device provided with an electronic device. Hardware configuration or software configuration of the user terminal (e.g., types (e.g., Windows, MacOS, etc.) or versions) of the operating system will not be limited in the embodiments of the present disclosure.

A user may operate an application installed on the user terminal 411 or a website logged in on the user terminal 411; the application or the website transmits user behavior data to the server 413 through the network 412; and the user terminal 411 may also receive data transmitted by the server 413 through the network 412.

For example, the user terminal 411 is installed with software having a live streaming function; a live user may utilize the software to perform live streaming on the user terminal 411-1, and a watching user may utilize the software to watch live streaming on the user terminal 411-2. Moreover, the user terminal 411 may execute the page display method provided by the embodiment of the present disclosure by running codes.

The network 412 may be a single network, or a combination of at least two different networks. For example, the network 412 may include, but is not limited to, one or a combination of several of a local area network, a wide area network, a public network, a private network, etc.

The server 413 may be a separate server or a server group; and the respective servers within the group are connected through a wired or wireless network. A server group may be centralized, for example, a data center, or distributed. The server 413 may be local or remote.

The database 414 may broadly refer to a device having a storage function. The database 414 is mainly configured to store various data utilized, generated, and output by the user terminal 411 and the server 413 during operation. The database 414 may be local or remote. The database 414 may include various types of memory, for example, Random Access Memory (RAM), Read Only Memory (ROM), and so on. The storage devices as mentioned above are just a few examples, and the storage device that the system 400 may use are not limited thereto.

The database 414 may be in interconnection or communication with the server 413 or a portion of the server 413 through the network 412, or in direct interconnection or communication with the server 413; or a combination of the above two modes may be adopted.

In some examples, the database 414 may be a standalone device. In other examples, the database 414 may also be integrated into at least one of the user terminal 411 and the server 413. For example, the database 414 may be set on the user terminal 411 or the server 413. For another example, the database 414 may also be distributed, with one portion set on the user terminal 411 and the other portion set on the server 413.

For example, the posted content of the target object may be deployed on the database 414. When the posted content of the target object needs to be acquired, the user terminal 411 accesses the database 414 through the network 412, and acquires the posted content of the target object stored in the database 414 through the network 412. Types of the database will not be limited in the embodiment of the present disclosure, for example, the database may be a relational database or a non-relational database.

At least one embodiment of the present disclosure further provides a page display apparatus; the apparatus can achieve a clear live streaming prompt effect for users browsing the page, attracting users browsing the page to watch current live streaming. Moreover, a live video and live associated information may provide the users browsing the page with more intuitive and rich visual experience, and allow the users browsing the page to watch the live information without entering the live room page, which improves user experience.

Figure 8:
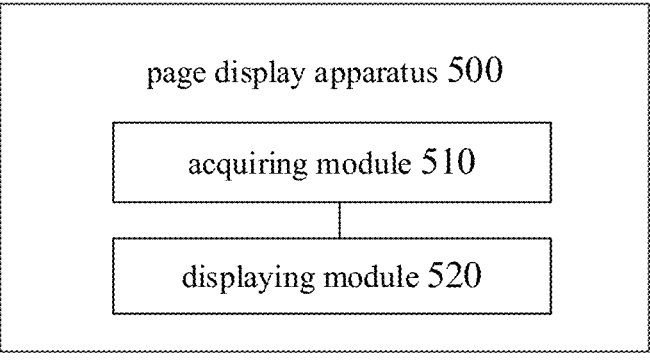
FIG. 8 is a schematic block diagram of a page display apparatus provided by some embodiments of the present disclosure.

FIG. 8 is a schematic block diagram of a page display apparatus provided by some embodiments of the present disclosure. As shown in FIG. 8, the page display apparatus 500 includes an acquiring module 510 and a displaying module 520. For example, the page display apparatus 500 may be applied to a user terminal, or may also be applied to any device or system that needs to implement page display, which will not be limited in the embodiments of the present disclosure.

The acquiring module 510 is configured to, in response to a display request for a content display page of the target object, acquire live information of current live streaming of a target object in a case where the target object is in a live streaming state, in which the live information includes live content and live associated information. For example, the acquiring module 510 may execute step S110 of the page display method shown in FIG. 1.

The displaying module 520 is configured to display the content display page, in which the content display page includes a content display region and a live region, the live region being configured to display live information, and the content display region being configured to display posted content of the target object. For example, the displaying module 520 may execute step S120 of the page display method shown in FIG. 1.

For example, the acquiring module 510 and the displaying module 520 may be hardware, software, firmware, or any feasible combination thereof. For example, the acquiring module 510 and the displaying module 520 may be special-purpose or general-purpose circuits, chips, or apparatuses, or may also be a combination of a processor and a memory. Specific implementation forms of the acquiring module 510 and the displaying module 520 will not be limited in the embodiments of the present disclosure.

It should be noted that in the embodiment of the present disclosure, the respective units of the page display apparatus 500 correspond to the respective steps of the foregoing page display method; relevant description of the page display method in the previous text may be referred to for specific functions of the page display apparatus 500, and no details will be repeated here. Components and structures of the page display apparatus 500 shown in FIG. 8 are only exemplary and not limitative; and the page display apparatus 500 may further include other components and structures as needed.

For example, in some examples, the live content is a live video; and the live region displays a portion of image of the live video.

For example, in some examples, the page display apparatus may further include a first interacting module; the first interacting module is configured to transform the content display page into the live room page corresponding to the current live streaming in response to a first interactive operation on the live region.

For example, in some examples, the live region is covered with a filter layer to display the portion of image of the live video.

For example, in some examples, the live region has a first display size; and the live room page has a second display size. The first interacting module is further configured to: make the live region gradually change from the first display size to the second display size, and make the live region gradually change from displaying a portion of image to displaying an entire image of the live video, during a transformation process.

For example, in some examples, the page display apparatus may further include a second interacting module; the second interacting module is configured to: in response to a second interactive operation on the content display page, make a display size of the live region decrease, and make a display size of the content display region increase; display a page floating window on the content display region, in a case where the display size of the live region decreases to an area threshold, the page floating window is configured to display information about the live content.

For example, in some examples, a display area of the live region is not less than ⅓ of a display area of the content display page.

For example, in some examples, the live associated information is divided into M categories; the M categories include at least one of associated object tag, transaction information, and comment information; M is a positive integer.

For example, in some examples, the live region displays information of N categories out of the M categories; the N categories are obtained based on a user selection operation, N is a positive integer less than M.

For example, in some examples, the live region displays a portion of information in each of the N categories; and the portion of information is selected from information of the N categories based on an information analysis model.

For example, in some examples, the associated object tag displayed by the live region includes at least one of: a tag of an associated object being displayed by live content at a current moment; a tag of an associated object located in a specific ranking position among a plurality of associated objects corresponding to live content; and a tag of an associated object having an optimal transaction parameter among a plurality of associated objects corresponding to live content.

For example, in some examples, the page display apparatus may further include a third interacting module; the third interacting module is configured to: turn off or turn on sound of live content in response to a third interactive operation on the content display page; in a case where the sound of the live content is to be turned off, make the sound of the live content gradually decrease within a predetermined time length after receiving the third interactive operation; in a case where the sound of the live content is to be turned on, make the sound of the live content gradually increase within a predetermined time length after receiving the third interactive operation.

Figure 9:
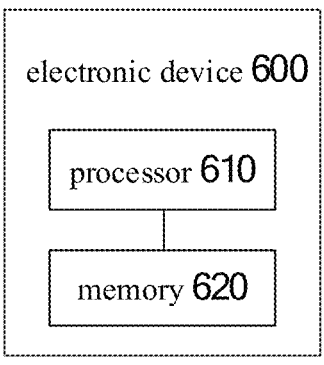
FIG. 9 is a schematic block diagram of an electronic device provided by some embodiments of the present disclosure.

FIG. 9 is a schematic block diagram of an electronic device provided by some embodiments of the present disclosure. As shown in FIG. 9, the electronic device 600 includes a processor 610 and a memory 620. The memory 620 is configured to store non-temporary computer readable instructions (e.g., one or more computer program modules). The processor 610 is configured to run the non-temporary computer readable instructions; and the non-temporary computer readable instructions, when run by the processor 610, may execute one or more steps in the page display method as described above. The memory 620 and the processor 610 may be interconnected through a bus system and/or other forms of connection mechanisms (not shown).

For example, the processor 610 may be a Central Processing Unit (CPU), a Digital Signal Processor (DSP), or other form of processing unit having a data processing capability and/or a program execution capability, for example, a Field Programmable Gate Array (FPGA), etc.; for example, the Central Processing Unit (CPU) may be an X86, or ARM architecture, etc. The processor 610 may be a general-purpose processor or a special-purpose processor, and may control other components in the electronic device 600 to execute desired functions.

For example, the memory 620 may include any combination of one or more computer program products; and the computer program products may include various forms of computer readable storage media, for example, a volatile memory and/or a non-volatile memory. The volatile memory may include, for example, a Random Access Memory (RAM) and/or a cache, or the like. The non-volatile memory may include, for example, a Read Only Memory (ROM), a hard disk, an Erasable Programmable Read Only Memory (EPROM), a portable Compact Disk Read Only Memory (CD-ROM), a USB memory, a flash memory, or the like. One or more computer program modules may be stored on the computer readable storage medium, and the processor 610 may run the one or more computer program modules, to implement various functions of the electronic device 600. Various applications and various data, as well as various data used and/or generated by the applications may also be stored on the computer readable storage medium.

It should be noted that in the embodiments of the present disclosure, the above description of the page display method may be referred to for specific functions and technical effects of the electronic device 600, and no details will be repeated here.

Figure 10:
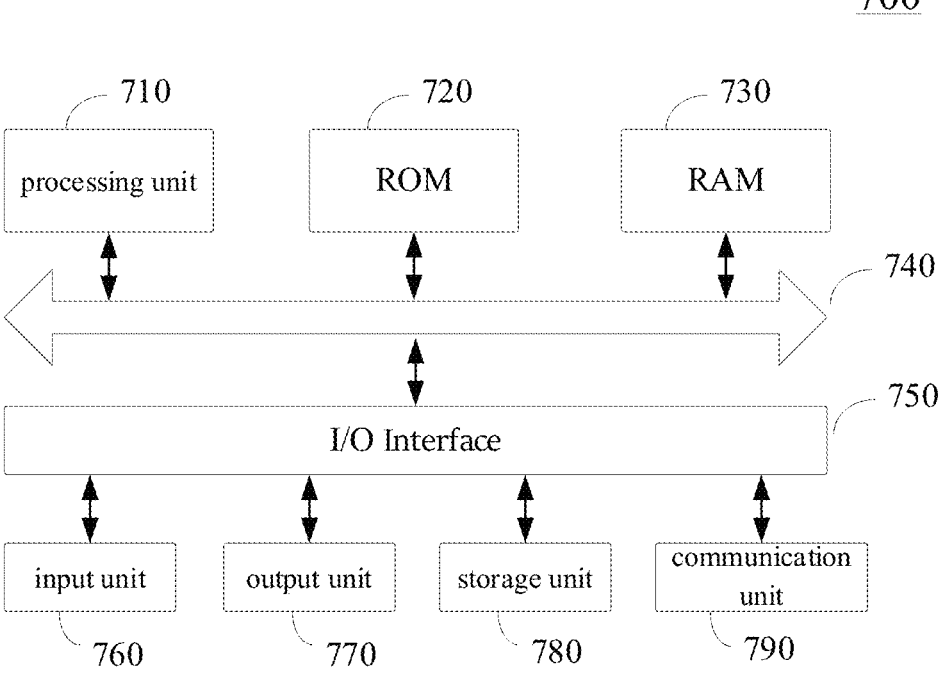
FIG. 10 is a schematic block diagram of another electronic device provided by some embodiments of the present disclosure.

FIG. 10 is a schematic block diagram of another electronic device provided by some embodiments of the present disclosure. The electronic device 700, for example, is suitable for implementing the page display method provided by the embodiment of the present disclosure. The electronic device 700 may be a user terminal, or the like. It should be noted that the electronic device 700 shown in FIG. 10 is only an example and does not impose any limitations on the functionality and scope of use of the embodiments of the present disclosure.

As shown in FIG. 10, the electronic device 700 may include the processing unit (e.g., a central processing unit (CPU), a graphics processing unit (GPU)) 710, which may execute various appropriate actions and processing according to programs stored in the ROM 720 or programs loaded to the RAM 730 from the storage unit 780. A plurality of programs and data required for the operation of the electronic device 700 are also stored in the RAM 730. The processing unit 710, the ROM 720 and the RAM 730 are connected with each other through a bus 740. An input/output (I/O) interface 750 is also connected to the bus 740.

In general, the following units may be connected to the I/O interface 750: an input unit 760 including a touch screen, a touch pad, a keyboard, a mouse, a camera, a microphone, an accelerometer, a gyroscope and the like; an output unit 770 including a liquid crystal display (LCD), a loudspeaker, a vibrator and the like; a storage unit 780 including magnetic tapes and hard disks; and a communication unit 790. The communication unit 790 may allow the electronic device 700 to communicate wirelessly in a wired manner with other electronic devices to exchange data. Although FIG. 10 shows the electronic device 700 including a plurality of units, it should be understood that not all the shown units are required to be implemented or included. The electronic device 700 may alternatively implement or include more or less units.

For example, according to the embodiments of the present disclosure, the page display method shown in FIG. 1 may be implemented as computer software programs. For instance, the embodiment of the present disclosure provides a computer program product, which includes computer programs hosted on a non-transient computer readable medium. The computer programs contain program codes for executing the above page display method, in such an embodiment, the computer programs may be unloaded and installed from the internet through the communication unit 790, or installed from the storage unit 780, or installed from the ROM 720. The functions defined in the page display method provided by the embodiment of the present disclosure are executed when the computer programs are executed by the processing unit 710.

At least one embodiment of the present disclosure provides a storage medium, configured to store non-temporary computer readable instructions, the non-temporary computer readable instructions, when executed by a computer, implement the page display method according to any embodiment of the present disclosure. The storage medium can achieve a clear live streaming prompt effect, attract users browsing the page to watch the current live streaming, and may provide users browsing the page with more intuitive and rich visual experience.

Figure 11:
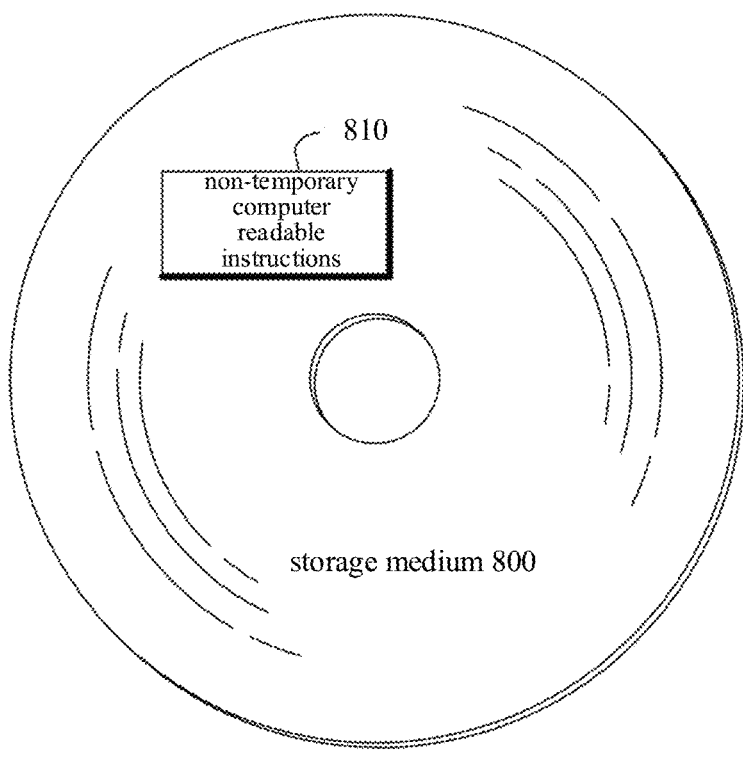
FIG. 11 is a schematic diagram of a storage medium provided by some embodiments of the present disclosure.

FIG. 11 is a schematic diagram of a storage medium provided by some embodiments of the present disclosure. As shown in FIG. 11, the storage medium 800 is configured to store non-temporary computer readable instructions 810. For example, the non-temporary computer readable instructions 810, when executed by a computer, implement one or more steps of the page display method according to the foregoing.

For example, the storage medium 800 may be applied in the electronic device 600 described above. For example, the storage medium 800 may be the memory 620 in the electronic device 600 shown in FIG. 9. For example, a related description of the storage medium 800 may be referred to the corresponding description of the memory 620 in the electronic device 600 shown in FIG. 9 and will not be repeated herein.

In the foregoing, a page display method, a page display apparatus, an electronic device, a storage medium, and a program product provided by embodiments of the present disclosure are described with reference to FIGS. 1 to 11. The page display method provided by embodiments of the present disclosure can achieve a clear live streaming prompt effect for the users browsing the page, thereby attracting the users browsing the page to watch the current live streaming. Moreover, the live video and the live associated information may provide the users browsing the page with more intuitive and rich visual experience, and allow the users browsing the page to watch the live information without entering the live room page, which improves user experience.

It should be noted that the above storage medium (computer readable medium) of the present disclosure may be a computer readable signal medium, a non-transitory computer readable storage medium, or any combination of the above. The non-transitory computer readable storage medium, for instance, may be, but not limited to, electrical, magnetic, optical, electromagnetic, infrared, or semiconductor system, device, or equipment, or a combination of the above. A more specific example of the non-transitory computer readable storage medium may include but not limited to: electrical connection having one or more wires, portable computer disk, hard disk, RAM, ROM, erasable programmable read-only memory (EPROM), flash memory, optical fiber, portable compact disk read-only memory (CD-ROM), optical storage unit, magnetic storage unit, or any suitable combination of the above. In the present disclosure, the non-transitory computer readable storage medium may be any tangible medium containing or storing programs. The programs may be used by a command execution system, device or unit or used in combination with the command execution system, device or unit. However, in the present disclosure, the computer readable signal medium may include data signals propagated in baseband or as part of carrier, in which computer readable program codes are hosted. The propagated data signals may adopt a plurality of forms, including but not limited to electromagnetic signals, optical signals or any suitable combination of the above. The computer readable signal medium may also be any computer readable medium except the non-transitory computer readable storage medium. The computer readable signal medium can send, propagate or transmit programs used by the command execution system, device or unit or used in combination with the command execution system, device or unit. The program codes contained in the computer readable medium can be transmitted by any appropriate medium, including but not limited to: wire, optical cable, radio frequency (RF) and the like, or any suitable combination of the above.

In some embodiments, the client and the server may communicate by utilization of any network protocol which is currently known or developed in the future such as Hyper Text Transfer Protocol (HTTP), and may be interconnected with digital data communication (e.g., communication network) in any form or medium. The example of the communication network includes local area network (LAN), wide area network (WAN), internet, end-to-end network (e.g., ad hoc end-to-end network), and any network which is current known or developed in the future.

The above computer readable medium may be contained in the above electronic device and may also exist alone and not be assembled into the electronic device.

The above computer readable medium hosts one or more programs. When the above one or more programs are executed by the electronic device, the electronic device is configured to: in response to a display request for a content display page of the target object, acquire live information of current live streaming of a target object in a case where the target object is in a live streaming state, in which the live information includes live content and live associated information; display the content display page, in which the content display page includes a content display region and a live region, the live region is configured to display live information, and the content display region is configured to display posted content of the target object.

Alternatively, the above computer readable medium hosts one or more programs. When the above one or more programs are executed by the electronic device, the electronic device is configured to: in response to a display request for a content display page of the target object, acquire live information of current live streaming of a target object in a case where the target object is in a live streaming state, in which the live information includes live content and live associated information; display the content display page, in which the content display page includes a content display region and a live region, the live region is configured to display live information, and the content display region is configured to display posted content of the target object.

Computer program codes for performing the operations of the present disclosure may be written in one or more programming languages or a combination thereof. The above programming languages include but not limited to object-oriented programming languages such as Java, Smalltalk and C++, and also include conventional procedural programming languages such as "C" language or similar programming languages. The program codes may be completely executed on a user computer, partially executed on the user computer, executed as a separate package, partially executed on the user computer and partially executed on a remote computer, or completely executed on the remote computer or the server. In the case where the remote computer is involved, the remote computer may be connected to the user computer through any kind of network, such as a Local Area Network (LAN) or a Wide Area Network (WAN), or, alternatively, may be connected to an external computer (for instance, connected via the Internet by utilization of Internet service providers).

The flowcharts and the block diagrams in the drawings show possible architectures, functions and operations of the system, the method and the computer program product according to the embodiments of the present disclosure. In this regard, each block in the flowchart or the block diagram may represent a module, a program segment, or a part of code. The module, the program segment, or the part of the code contains one or more executable instructions for implementing specified logic functions. It should be also noted that in some alternative implementations, the functions marked in the blocks may also occur in a different order from those marked in the drawings. For instance, two consecutive blocks may actually be executed basically in parallel, and sometimes, may also be executed in a reverse order, determined by involved functions. It should be also noted that each block in the block diagram and/or the flowchart and the combination of the blocks in the block diagram and/or the flowchart may be implemented by a dedicated hardware-based system that performs a specified function or operation, and may also be implemented by the combination of a special hardware and computer instructions.

Units involved in the embodiments of the present disclosure may be implemented by software, and may also be implemented by hardware. Wherein, the name of the unit should not define the unit under certain circumstances.

The functions described above in this document may be at least partially executed by one or more hardware logical units. For instance, without limitation, demonstration type hardware logical units that may be used include: field programmable gate array (FPGA), application-specific integrated circuit (ASIC), application specific standard parts (ASSP), system on a chip (SOC), complex programmable logic device (CPLD), etc.

In the present disclosure, the machine readable medium may be a tangible medium and may include or store programs used by command execution system, device or equipment or used in combination with the command execution system, device or equipment. The machine readable medium may be a machine readable signal medium or a machine readable storage medium. The machine readable medium may include but not limited to electronic, magnetic, optical, electromagnetic, infrared, or semiconductor system, device or equipment, or any suitable combination of the above. A more specific example of the machine readable storage medium may include electrical connection based on one or more wires, portable computer disk, hard disk, RAM, ROM, EPROM, flash memory, optical fiber, CD-ROM, optical storage unit, magnetic storage unit, or any suitable combination of the above.

The above description is only the explanation of a partial embodiment of the present disclosure and the used technical principle. It should be understood by those skilled in the art that the disclosure scope involved in the disclosure is not limited to the technical solution formed by the specific combination of the above technical features, but also covers other technical solutions formed by any combination of the above technical features or their equivalent features without departing from the above disclosed concept. For example, the technical solution formed by replacing the above features with (but not limited to) technical features with similar functions disclosed in the disclosure.

In addition, although the operations are depicted in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of a single embodiment may also be implemented in a plurality of embodiments alone or in any suitable subcombination.

Although the subject matter has been described in language specific to structural features and/or logical actions of methods, it should be understood that the subject matter defined in the appended claims is not necessarily limited to the specific features or actions described above. On the contrary, the specific features and actions described above are only example forms of realizing the claims.

What is claimed is:

1. A page display method, comprising: in response to a display request for a content display page of a target object, acquiring live information of current live streaming of the target object from a server by a terminal device communicating with the server through a communication network in a case where the target object is in a live streaming state, wherein the live information comprises live content and live associated information; displaying the content display page by a display device of the terminal device, wherein the content display page comprises a content display region and a live region, the live region is configured to display live information, the live associated information displayed in the live region comprised in the content display page comprises information about an item to be transacted, and the content display region is configured to display posted content of the target object, wherein the live content is a live video: and the live region displays a portion of image of the live video and in response to a first interactive operation on the live region, transforming the content display page into a live room page corresponding to the current live streaming, wherein the transforming the content display page into a live room page corresponding to the current live streaming, comprises: making the live region gradually change from displaying the portion of image to displaying an entire image of the live video and making the live associated information gradually change a position, during a transformation process.

2. The page display method according to claim 1, wherein the live region is covered with a filter layer to display the portion of image of the live video.

3. The page display method according to claim 1, wherein the live region has a first display size; and the live room page has a second display size; the transforming the content display page into a live room page corresponding to the current live streaming further comprises: making the live region gradually change from the first display size to the second display size, during the transformation process.

4. The page display method according to claim 1, further comprising: in response to a second interactive operation on the content display page, making a display size of the live region decrease, and making a display size of the content display region increase; displaying a page floating window on the content display region, in a case where the display size of the live region decreases to an area threshold, wherein the page floating window is configured to display information about the live content.

5. The page display method according to claim 1, wherein a display area of the live region is not less than ⅓ of a display area of the content display page.

6. The page display method according to claim 1, wherein the live associated information is divided into M categories; the M categories comprise at least one of associated object tag, transaction information, and comment information; wherein M is a positive integer.

7. The page display method according to claim 6, wherein the live region displays information of N categories out of the M categories; the N categories are obtained based on a user selection operation, wherein N is a positive integer less than M.

8. The page display method according to claim 7, wherein the live region displays a portion of information in each of the N categories; and the portion of information is selected from information of the N categories based on an information analysis model.

9. The page display method according to claim 6, wherein the associated object tag displayed by the live region comprises at least one of: a tag of an associated object being displayed by the live content at a current moment; a tag of an associated object located in a specific ranking position among a plurality of associated objects corresponding to the live content; and a tag of an associated object having an optimal transaction parameter among a plurality of associated objects corresponding to the live content.

10. The page display method according to claim 1, further comprising: turning off or turning on sound of the live content in response to a third interactive operation on the content display page; in a case where the sound of the live content is to be turned off, making the sound of the live content gradually decrease within a predetermined time length after receiving the third interactive operation; in a case where the sound of the live content is to be turned on, making the sound of the live content gradually increase within a predetermined time length after receiving the third interactive operation.

11. An electronic device, comprising: a processor; a memory, comprising one or more computer program modules; wherein the one or more computer program modules are stored in the memory and configured to be executed by the processor, and the one or more computer program modules comprise instructions for implementing a page display method, and the page display method comprises: in response to a display request for a content display page of a target object, acquiring live information of current live streaming of the target object from a server by a terminal device communicating with the server through a communication network in a case where the target objects in a live streaming state, wherein the live information comprises live content and live associated information; displaying the content display page by a display device of the terminal device, wherein the content display page comprises a content display region and a live region, the live region is configured to display live information, the live associated information displayed in the live region comprised in the content display page comprises information about an item to be transacted, and the content display region is configured to display posted content of the target object, wherein the live content is a live video: and the live region displays a portion of image of the live video; and in response to a first interactive operation on the live region, transforming the content display page into a live room page corresponding to the current live streaming, wherein the transforming the content display page into a live room page corresponding to the current live streaming, comprises: making the live region gradually change from displaying the portion of image to displaying an entire image of the live video and making the live associated information gradually change a position, during a transformation process.

12. A computer-readable storage medium, configured to store non-transitory computer readable instructions, wherein the non-transitory computer readable instructions, when executed by a computer, implement a page display method, which comprises: in response to a display request for a content display page of the target object, acquiring live information of current live streaming of a target object from a server by a terminal device communicating with the server through a communication network in a case where the target object is in a live streaming state, wherein the live information comprises live content and live associated information; displaying the content display page by a display device of the terminal device, wherein the content display page comprises a content display region and a live region, the live region is configured to display live information, the live associated information displayed in the live region comprised in the content display page comprises information about an item to be transacted, and the content display region is configured to display posted content of the target object, wherein the live content is a live video; and the live region displays a portion of image of the live video; and in response to a first interactive operation on the live region, transforming the content display page into a live room page corresponding to the current live streaming, wherein the transforming the content display page into a live room page corresponding to the current live streaming, comprises: making the live region gradually change from displaying the portion of image to displaying an entire image of the live video and making the live associated information gradually change a position, during a transformation process.

13. The page display method according to claim 2, wherein the live region has a first display size; and the live room page has a second display size; the transforming the content display page into a live room page corresponding to the current live streaming further comprises: making the live region gradually change from the first display size to the second display size- and making the live region gradually change from displaying the portion of image to displaying an entire image of the live video, during the transformation process.

14. The page display method according to claim 2, further comprising: in response to a second interactive operation on the content display page, making a display size of the live region decrease, and making a display size of the content display region increase; displaying a page floating window on the content display region, in a case where the display size of the live region decreases to an area threshold, wherein the page floating window is configured to display information about the live content.

15. The page display method according to claim 3 wherein a display area of the live region is not less than ⅓ of a display area of the content display page.

16. The page display method according to claim 3, wherein the live associated information is divided into M categories; the M categories comprise at least one of associated object tag, transaction information, and comment information; wherein M is a positive integer.

17. The page display method according to claim 6, further comprising: turning off or turning on sound of the live content in response to a third interactive operation on the content display page; in a case where the sound of the live content is to be turned off, making the sound of the live content gradually decrease within a predetermined time length after receiving the third interactive operation; in a case where the sound of the live content is to be turned on, making the sound of the live content gradually increase within a predetermined time length after receiving the third interactive operation.

\* \* \* \* \*